| United States Patent [19] | [11] Patent Number: 4,849,240 |
| Giddey et al. | [45] Date of Patent: Jul. 18, 1989 |

[54] LOW-DENSITY FOOD PRODUCT COMPRISED OF HONEY MOUSSE, AND PRODUCTION METHOD THEREOF

[75] Inventors: Claude Giddey, Geneva; Georges Dove, Carouge, both of Switzerland

[73] Assignee: Battelle Memorial Institute, Carouge-Geneva, Switzerland

[21] Appl. No.: 180,982

[22] PCT Filed: Jul. 20, 1987

[86] PCT No.: PCT/CH87/00090
§ 371 Date: Mar. 28, 1988
§ 102(e) Date: Mar. 28, 1988

[87] PCT Pub. No.: WO88/00796
PCT Pub. Date: Feb. 11, 1988

[30] Foreign Application Priority Data
Jul. 28, 1986 [CH] Switzerland ............... 3021/86

[51] Int. Cl.$^4$ ................................. A23L 1/08
[52] U.S. Cl. ........................ 426/564; 426/659; 426/613; 426/572
[58] Field of Search ............... 426/564, 658, 613

[56] References Cited

U.S. PATENT DOCUMENTS

| 2,052,358 | 3/1933 | Lund | 426/564 |
| 2,295,274 | 9/1942 | Walker | 426/658 |
| 3,366,494 | 1/1968 | Bower | 426/564 |
| 4,004,040 | 1/1977 | Puta | 426/564 |
| 4,232,494 | 11/1980 | Blake | 426/564 |

*Primary Examiner*—Jeanette Hunter
*Attorney, Agent, or Firm*—Cushman, Darby & Cushman

[57] ABSTRACT

Non-creamed honey mousse comprised of a dispersion of air microbubbles in honey containing in addition a stabilier and a foaming agent. Its density is 0.7 or less. It is soft but does not flow.

10 Claims, No Drawings

LOW-DENSITY FOOD PRODUCT COMPRISED OF HONEY MOUSSE, AND PRODUCTION METHOD THEREOF

The invention relates to a light food product, specifically a honey mousse consisting of a stable dispersion of very small bubbles of air or of an inert gas in melted uncreamed honey containing at least one stabilizer and one expansion agent, this mousse having a density that is lower than 0.7. This mousse has a consistency that is firm, non-flowing, but soft and velvety, and can be spread easily, for example, on bread. The term "uncreamed" means that it is a liquid honey without any microcrystalline stage consisting of the sugar of crystalized honey. The invention also relates to a process for preparing this type of honey mousse.

It seems that this type of foamed honey is not found in prior art. Thus, U.S. Pat. No. 3,976,803 describes a mousse comprising approximately by weight 50% of a 3-97 : 97-3 mixture of syrup of glucose and of syrup of maltose and 50% dextrose or a mixture of dextrose and sucrose.

Moreover, the U.S. Pat. No. 1,686,556 text describes a honey emulsion (or substances similar to syrups) with egg whites, this emulsion occurring in the form of a cream or paste to be spread on crackers or slides of bread or to be used for the icing of cakes and for the filling of pastry. This type of creamy emulsion is obtained by beating honey with egg white, preferably at approximately 80° C. (180° F.). This egg white may be in the form of an aqueous, unbeaten egg white solution or in the form of an egg white that was first beaten stiff. The density of this cream, however, is not lower than 0.7 and furthermore, it is an emulsion that was obtained by beating honey in the egg white and not a mousse, as in the case of the present invention.

The U.S.-A 2,052,358 patent text describes a creamed honey mousse obtained by beating a honey containing microcrystals of dextrose with air, the formation of which is aided by a previous chilling. This is a light, solid product, similar to a fondant, of a density in the order of 0.75 which, in order to be used, can be softened by heating. It may, by the way, contain egg white and pectin and its water content is less than 20%.

The honey mousse according to the invention, in contrast, does not represent a rigid structure before being softened by heat. Its consistency, although firm, is soft and velvety even at temperatures that are lower than room temperature (for example, between 10 and 20° C.), and it has no tendency to run like ordinary liquid honey. Its consistency appears somewhat like that of mayonnaise.

As a stabilizer of the present mousse, polysaccharides may be used as structure additives, for example, tragacanth, xanthane and other similar gums; pectin as well as polypeptides or proteins, such as gelatin. Generally, the amount of stabilizer used in the present mousse is in the order of 0.1 to 1.5 percent in weight, preferably 0.3 to 0.7%, but these amounts may be exceeded in one way or another, if this is necessary in certain special cases.

The present mousse contains one or several expanding and foaming agents to be selected among egg white and the hydrolysates of protein used in the food industry, for example, hydrolysates of vegetable proteins, such as those of the soybean, or hydrolysates of animal protein, such as casein. Foaming agents of this type may be procured under the names of Hyfoama [Ledering (The Netherlands)] or Biambel [BEL Industries, France], among other similar products. With respect to the egg white, powdered egg white that is dissolved in water according to conventional methods, or fresh egg white may be used. The amounts of foaming agents contained in the present honey mousse are in the order of 0.1 to 1.2% in weight of the dry product with respect to the original honey, preferably from 0.3 to 0.6%, although, if necessary, these amounts may be exceeded in certain special cases.

In the natural state, honey always contains a certain amount of water.

The present mousse preferably contains an amount of water (with respect to the solids of the original honey) in the order of 20 to 30%. If, in general and as a result of its origin, the raw honey contains 15 to 22% water, it may be necessary, according to the embodiment of the present mousse, to add, at the time of its production, a certain amount of water when the original honey does not contain sufficient water. It will be noted that the term "honey" used here covers bee honey as well as honeys of vegetable origin, such a concentrated syrups, for example, maple syrup. It will also be noted that the acceptable maximum amount of water of the described creamed honey mousse described in the U.S.-A 2,052,358 patent text is less than 20% in weight.

Advantageously, the present honey mousse also contains 0.01 to 0.5% in weight (with respect to the original honey) of a water-soluble or water-dispersable food coloring agent for providing the mousse with a color that brings back the color of the natural honey. In fact, it is evident that the presence of a large number of microscopic air or gas bubbles dispersed in the honey cause a considerable lightening of its original color and that, for commercial reasons, it is preferable to provide the mousse with a more lively color. Ther use of natural yellow, orange or brown coloring agents, such as $\beta$-carotenoids, flavonoids and derivatives of saffron is preferable. Among the coloring agents, the following coloring agents may be mentioned: Apocarotenal and Canthaxanthine (Roche), the latter of these coloring agents being derived from paprika. It should be pointed out that, when the mousse is stored in appropriate transparent containers (glass, plastic food containers, etc.), a "whitening" effect of the gas bubbles of the mousse at the periphery (i.e., at the interface between the mousse and the walls of the container) may be reduced by applying pressure to the filling which has the effect of making a certain proportion of these bubbles disappear in the contact with this interface and thus brightening its color.

In order to prepare the honey mousse according to the present invention, the stabilizing agent or agents, the possibly added water and the foaming agent or agents are added successively to the original raw honey, while stirring moderately and applying low heat; then, when the temperature of the mixture (having become liquid and homogeneous) is between 40 and 50° C., a vigorous beating will take place in the presence of air or gas in a conventional type of beater for beating eggs stiff or for making whipped cream. This type of violent stirring results in a cooling of the mass, its temperature, during the beating, changing from 40°–50° C. to 25°–35° C. This treatment results in a light and stable mousse of a density of less than 0.7, generally between 0.5 and 0.7. The duration of the beating generally varies between 3 and 30 minutes according to the properties to be provided to the mousse; in general, a long beating results in a more elastic consistency of the product than a short heating. It is generally preferred to stop the beating when the temperature, that originally was 40 to 50° C. has again fallen to the value of room temperature. If desired, the heat source used during the formation of the honey-water-additive mixture may be removed during the beating.

The results obtained according to this process and the resulting low density of the mousse are surprising if reference is made to the product described in the U.S.-A 1,686,556 patent text which does not furnish a mousse, but an emulsion in the form of paste. It is probable that one of the reasons of these differences is the beating temperature which is 80° C. in the reference, whereas, in the invention, it is essential that it does not exceed 50° C. A temperature that is too high may, in fact, result in a premature gelatenization and denaturing of the ingredients. Another difference is probably the fact that, in the reference, the egg white was previously beaten and that then the honey is beaten with this previously beaten egg white; in fact, if, as a variant of the above-described process of the invention, beaten egg white is mixed with the honey solution containing the other remaining ingredients, care must be taken that this "stiff" egg white is not broken up by violent stirring, but that it is gently blended in by means of stratification.

When, in the present manufacturing process, one or several coloring agents are added, these coloring agents are added together with the foaming agent, before the beating. Milk proteins, such as skimmed milk, may also be added to the mixture.

The present honey mousse is stable when stored over long periods of time and, when it is prepared correctly, does not result in a syneresis, i.e., a phase separation. It has a very delicate taste which is considerably "fuller" than that of the original honey. It may be eaten like ordinary honey and also, because of its lightness, it may be used advantageously in pastry (for filling tarts and cakes) and in confectioneries for chocolate candy. Its structure is delicate and soft, but firm, and can, in no case, be mistaken for that of "marshmallows", and other soft nougats.

Furthermore, the present mousse can be turned into other different types of food, for example, by blending in pieces of dried fruit, whole or ground almonds, nuts, hazelnuts, the proportion of these additions being in the order of 10 to 50% in weight. Moreover, the present honey mousse may be used for the production of food types that are balanced by the addition of proteins, such as powdered milk or other proteins of animal or vegetable origin. These types of food may be in the form of emulsions, yogurt creams, spreadable pastes or be eaten as they are.

The following examples explain the invention.

EXAMPLE 1

88.1 g of commercial honey (Nectar Flor) containing 19% water were placed in a container equipped with a mixer. 0.4 g of xanthane gum, 11 g of water, 0.5 g of Hyfoama DS and 0.3 g of an aqueous solution containing 10% cantaxanthine were added and dispersed by a slow stirring, while being heated to 40°-50° C. Then a vigorous beating tool took place for 8 minutes in a Hobart beater, the heat source having been removed. At the end of the beating phase, the temperature had fallen back to 25° C.

Thus, a light mousse (density 0.55) was obtained of a yellow color and of a very delicate taste. This mousse did not result in any phase separation phenomenon after a prolonged storage at room temperature in a closed container.

EXAMPLE 2

The process took place as mentioned above, but with the following differences: 88.7 g of honey; 9 g of water; 0.3 g of Xanthanne; 2 g of Hyfoama in a 20% aqueous solution; coloring agent: 0.45 g of $\beta$-carotene in the form of a 10% aqueous solution. The beating lasted for 6 minutes and furnished a mousse with a density of 0.6, the properties of which were approximately the same as those of the mousse of Example 1.

EXAMPLE 3

The process took place as in the preceding examples and the below-indicated compositions were prepared by means of the indicated ingredients. In addition, 9 g of water and 0.5 g of Xanthanne gum and 0.45 g of a 10% aqueous solution of the coloring agent $\beta$-carotenal were added to each composition.

| Composition | Honey (g) | Foaming Agent (g) |
| --- | --- | --- |
| 1 | MIGROS (87) | Egg white/water (0.7/2.8) |
| 2 | MIGROS (87) | Hyfoama/water (0.7/2.8) |
| 3 | MELLONA (87) | Egg white/Hyfoama/water (0.7/0.7/2.8) |
| 4 | ACACIA (86,75) | Hyfoama/water (0.75/3) |

The above-mentioned compositions 1 to 4 were subjected to a beating for the time periods indicated below, the temperature at the start of the beating also being indicated as well as the density of the mousse.

| Composition | Temperature (°C.) | Beating (min.) | Density of Mousse |
| --- | --- | --- | --- |
| 1 | 50 | 7 | 0.7 |
| 2 | 50 | 7 | 0.7 |
| 3 | 45 | 6 | 0.4 |
| 4 | 45 | 6 | 0.55 |

The honey mousses obtained on the basis of compositions 1 to 4 were soft, light and had an excellent taste. They were preserved without syneresis for a very long time.

EXAMPLE 4

Correspondinng to the process described in the preceding examples, the compositions numbered 5 to 8 were prepared by means of the following ingredients in the indicated amounts (g). Dissolving temperature 4°-45° C.

| Ingredients (g) | Composition | | | |
| --- | --- | --- | --- | --- |
|  | 5 | 6 | 7 | 8 |
| Honey | 77.85 | 77.85 | 74.63 | 74.63 |
| Citric acid monohydrate | 0.25 | 0.25 | 0.24 | 0.24 |
| Skimmed milk | 10 | 10 | 9.52 | 9.52 |
| Xanthane Gum (CX-91) | 0.2 | 0.2 | 0.19 | 0.19 |
| Guar Gum (MEYPROGUAR)* | 0.2 | 0.2 | 0.19 | 0.19 |
| Hyfoama** | 0.3 | 0.3 | 0.38 | 0.38 |
| Water | 11.2 | 9.67 | 10.09 | 10.19 |
| Apocarotenone ester (10% aqueous solution) | 0.86 | 1.7 | — | — |
| Grated hazelnuts | — | — | 4.76 | — |
| Orange peels | — | — | — | 4.76 |

-continued

| Ingredients (g) | Composition | | | |
|---|---|---|---|---|
| | 5 | 6 | 7 | 8 |
| Total water content (% in weight) | 25 | 25 | 26.5 | 26 |

*Product sold by Meihall Co., Kreuzlingen.
**Counted as dry weight, but added in the form of a 20% aqueous solution (1.5 g for composition 5 and 6; 1.9 g for composition 7 and 8).

Then these compositions were beaten at the following conditions and mousses of the following properties were obtained:

| | Composition | | | |
|---|---|---|---|---|
| | 5 | 6 | 7 | 8 |
| Beating time (min.) | 2.5 | 3 | 1.5 | 1.5 |
| Temperature at end of beating (°C.) | 30 | 30 | 25 | 28 |
| pH | 5.4 | 5.25 | 5.3 | 5.3 |
| Density of mousse | 0.6 | 0.62 | 0.6 | 0.6 |

We claim:

1. A honey mousse consisting of a microdispersion of air and melted and uncreamed honey, wherein said mousse contains an effective amount of at least one stabilizer and an effective amount of at least one foaming agent, and wherein said mousse has a density of 0.7 or less and a velvety and nonflowable consistency at room temperature.

2. A honey mousse according to claim 1, characterized in that the stabilizer is selected among reticulated carbohydrates and polypeptides of food quality in the amount of 0.1 to 1.5% in weight with respect to the original honey.

3. A honey mousse according to claim 2, characterized in that the stabilizer is selected among natural gums, particularly gum arabic, xanthanne, guar, as well as gelatin.

4. A honey mousse according to claim 1, characterized in that the foaming agent is selected among foaming hydrolysates of vegetable and animal proteins, particularly soybean and casein, as well as egg white, the amount of the foaming agent or agents, in weight with respect to the original honey, being from 0.1 to 1.2%.

5. A honey mousse according to claim 1, characterized in that its water content is between 20 and 30%.

6. A honey mousse according to claim 1, characterized in that it also contains 0.01 to 0.5% in weight of a food coloring agent, particularly a natural coloring agent selected among $\beta$-carotenoids, flavonoids and derivatives of saffron.

7. A honey mousse according to claim 1, characterized in that it also contains milk proteins or skimmed milk.

8. A process for the preparation of the honey mousse according to claim 1, characterized in that the stabilizing and foaming agents as well as additional water are mixed with the honey at between 25 and 50° C., and said mixture is then beaten vigorously in the presence of air or an inert gas, such as $N_2$, in order to foam it, an additional effect of this operation being the cooling of the mousse to 25°–35°.

9. A process according to claim 8, characterized in that a food coloring agent and/or milk proteins are also added to the above-mentioned ingredients before carrying out the beating.

10. A process according to claim 8, characterized in that the duration of the beating is 3 to 30 minutes.

* * * * *